US012561111B1

(12) United States Patent
Fictum

(10) Patent No.: US 12,561,111 B1
(45) Date of Patent: Feb. 24, 2026

(54) SYSTEM AND METHOD FOR SYNCHRONIZING AUDIO CONTENT WITH PRINTED MEDIA

(71) Applicant: Casey Lee Fictum, Omaha, NE (US)

(72) Inventor: Casey Lee Fictum, Omaha, NE (US)

( * ) Notice: Subject to any disclaimer, the term of this patent is extended or adjusted under 35 U.S.C. 154(b) by 0 days.

(21) Appl. No.: 18/885,596

(22) Filed: Sep. 14, 2024

(51) Int. Cl.
*G06F 3/16* (2006.01)
*G06V 10/82* (2022.01)
*G06V 30/41* (2022.01)

(52) U.S. Cl.
CPC .............. *G06F 3/165* (2013.01); *G06V 10/82* (2022.01); *G06V 30/41* (2022.01)

(58) Field of Classification Search
CPC ......... G06F 3/165; G06V 10/82; G06V 30/41
See application file for complete search history.

(56) References Cited

U.S. PATENT DOCUMENTS

| | | | |
|---|---|---|---|
| 9,049,398 B1 * | 6/2015 | Moscovich | ............ G06F 3/002 |
| 9,317,486 B1 * | 4/2016 | Story, Jr. | ............... G06F 3/0425 |
| 2013/0201185 A1 * | 8/2013 | Kochi | ................... A63F 13/213 |
| | | | 345/419 |
| 2015/0123966 A1 * | 5/2015 | Newman | ............... G06T 19/006 |
| | | | 345/419 |
| 2022/0004753 A1 * | 1/2022 | Komamine | .......... H05B 47/165 |
| 2023/0106673 A1 * | 4/2023 | Asghar | ............... A61B 5/4809 |
| | | | 382/104 |
| 2025/0224918 A1 * | 7/2025 | Sampat | ................... G06F 3/013 |

* cited by examiner

*Primary Examiner* — Mohamed A. Wasel
(74) *Attorney, Agent, or Firm* — Aundria Hairell

(57) ABSTRACT
The system enhances printed material with synchronized audio content by capturing images of printed pages using an image capture. The captured images are then processed using a computer vision algorithm to recognize specific pages or page spreads. A database of corresponding audio files is stored, and the playback triggers and controls audio playback based on recognized pages. Additionally, a wearable positioning system allows hands-free positioning of the image capture device.

10 Claims, 5 Drawing Sheets

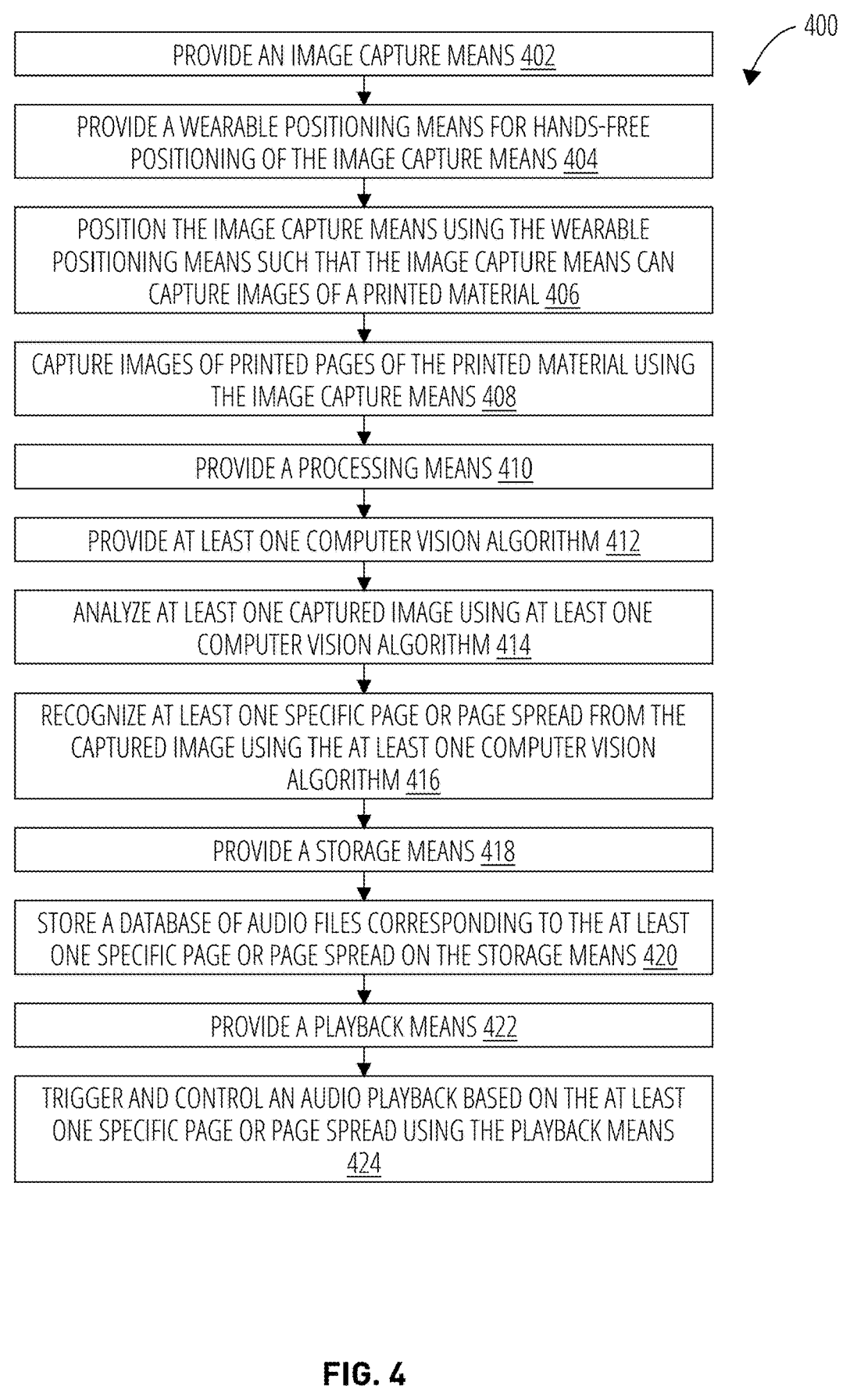

400

PROVIDE AN IMAGE CAPTURE MEANS 402

PROVIDE A WEARABLE POSITIONING MEANS FOR HANDS-FREE POSITIONING OF THE IMAGE CAPTURE MEANS 404

POSITION THE IMAGE CAPTURE MEANS USING THE WEARABLE POSITIONING MEANS SUCH THAT THE IMAGE CAPTURE MEANS CAN CAPTURE IMAGES OF A PRINTED MATERIAL 406

CAPTURE IMAGES OF PRINTED PAGES OF THE PRINTED MATERIAL USING THE IMAGE CAPTURE MEANS 408

PROVIDE A PROCESSING MEANS 410

PROVIDE AT LEAST ONE COMPUTER VISION ALGORITHM 412

ANALYZE AT LEAST ONE CAPTURED IMAGE USING AT LEAST ONE COMPUTER VISION ALGORITHM 414

RECOGNIZE AT LEAST ONE SPECIFIC PAGE OR PAGE SPREAD FROM THE CAPTURED IMAGE USING THE AT LEAST ONE COMPUTER VISION ALGORITHM 416

PROVIDE A STORAGE MEANS 418

STORE A DATABASE OF AUDIO FILES CORRESPONDING TO THE AT LEAST ONE SPECIFIC PAGE OR PAGE SPREAD ON THE STORAGE MEANS 420

PROVIDE A PLAYBACK MEANS 422

TRIGGER AND CONTROL AN AUDIO PLAYBACK BASED ON THE AT LEAST ONE SPECIFIC PAGE OR PAGE SPREAD USING THE PLAYBACK MEANS 424

FIG. 4

SYSTEM AND METHOD FOR SYNCHRONIZING AUDIO CONTENT WITH PRINTED MEDIA

BACKGROUND

Synchronized audio content in printed materials refers to the integration of sound with visual elements, such as images or text, within a printed document. This synchronization can enhance user experiences by providing additional contextual information and creating an immersive multimedia experience.

In the digital age, printed books, especially visually rich formats like coffee table books, face increasing competition from electronic media and social networks. While e-books offer features like audio & media syncing, they lack the tactile experience of physical books (non-digital). Previous attempts to enhance printed books with digital content have often relied on QR codes, specialized printing techniques, or physical sensors embedded in pages, which can be intrusive, costly, or alter the book's appearance. This system and method aim to bring enhancements to traditional printed books without sacrificing comfort or interfering with the highly visual printed reading experience.

It is an object of the present system and method is to provide an improved method and system for making and playing audio content that is configured for synchronized playback with the reading of a corresponding printed material.

BRIEF SUMMARY

In certain embodiments, a system may be designed to enhance printed material with synchronized audio content. This system typically comprises an image capture mechanism for capturing images of printed pages, a processing component that utilizes computer vision algorithms to recognize specific page or page spreads within the captured images, and a storage facility that houses a database of corresponding audio files. Additionally, a playback mechanism is capable of initiating and controlling audio output based on the recognized page or page spread. Finally, this system may include wearable positioning technology for the hands-free operation of the image capture device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a routine 400 in accordance with one embodiment.

DETAILED DESCRIPTION

The following description is presented to enable a person skilled in the art to make and use the system and is provided in the context of a particular application and its requirements. Various modifications to the disclosed embodiments will be readily apparent to those skilled in the art, and the general principles defined herein may be applied to other embodiments and applications without departing from the scope of the invention. Thus, the present system and method is not intended to be limited to the embodiments disclosed but is to be accorded the most comprehensive scope consistent with the principles and features disclosed herein.

Figure 1:
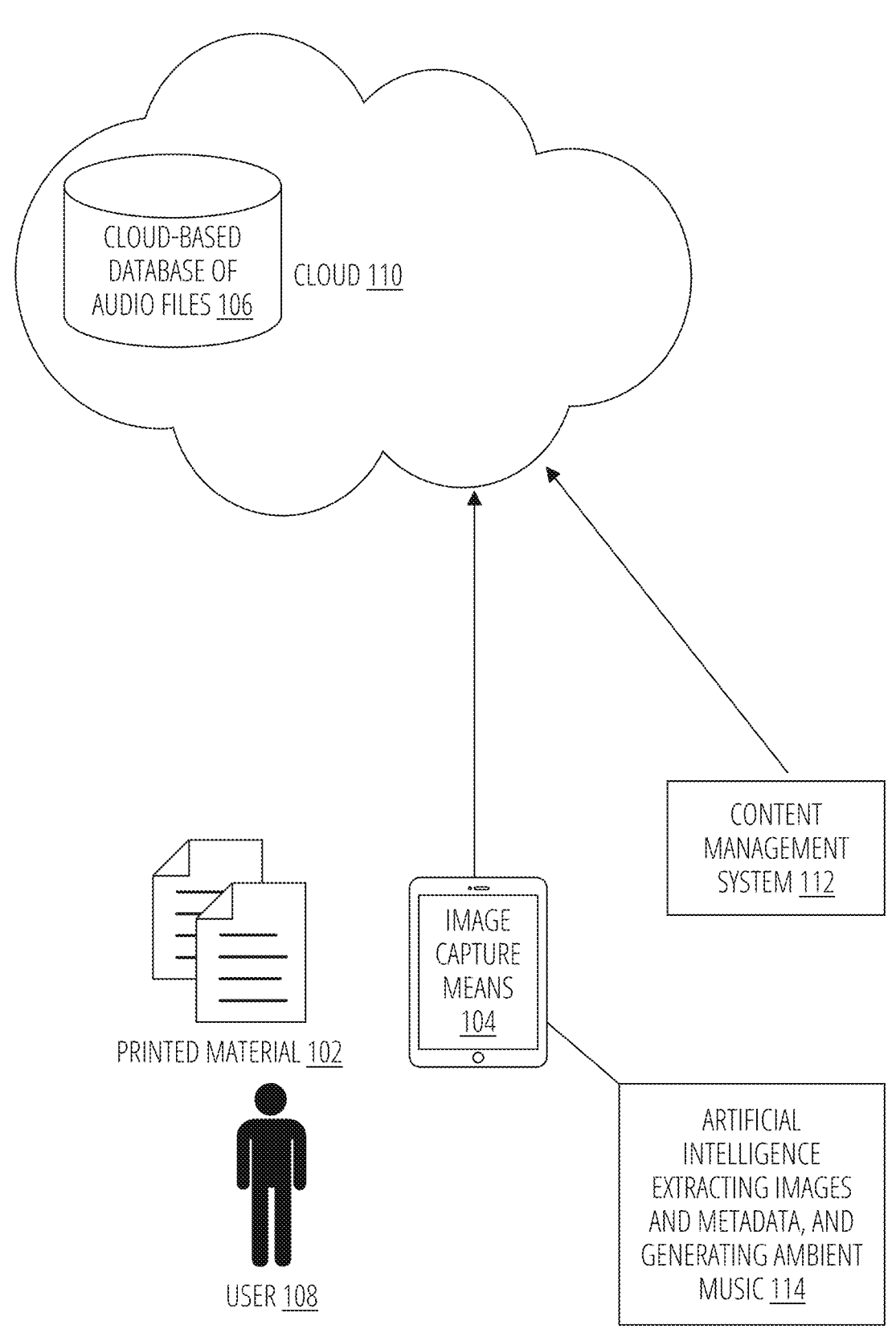
FIG. 1 illustrates an aspect of the subject matter in accordance with one embodiment.

Referring to FIG. 1, a system for enhancing printed material 102 with synchronized audio content is shown. The system includes an image capture means 104 for capturing images of printed pages. The image capture means 104 could include any cloud-integrated or internet-capable device with a camera, such as a mobile device.

A processing means analyzes the captured images of printed pages using at least one computer vision algorithm to recognize at least one specific page or page spread. The at least one computer vision algorithm may include a convolutional neural network, feature extraction techniques, or image preprocessing techniques. The feature extraction techniques may include Scale-Invariant Feature transform (SIFT), Oriented features from accelerated segment test and Rotated Binary robust independent elementary features (ORB) or Accelerated KAZE algorithm (AKAZE). The image preprocessing techniques may include adaptive thresholding for different lighting situations or perspective correction to adjust image skewing. Glare and shadow removal algorithms may be used to enhance recognition accuracy in suboptimal lighting. Text line detection and Optical Character Recognition (OCR) may be used as a fallback mechanism for page identification when image features are insufficient. The system continuously analyzes the camera feed at optimized intervals to balance accuracy and power consumption. Upon recognition of a new page, cover or page spread, it triggers the playback of corresponding audio content with minimal latency. It also has the ability to recognize the act of a page fully turning in cases where it may need to trigger analysis due to low latency or speed. In situations where lighting is low, the system allows for use of the device's flashlight or equivalent lighting feature to increase lighting of the printed material 102. Real-time image normalization and noise reduction may be achieved using a custom FPGA (Field Programmable Gate Arrays) implementation.

The system includes a processing means for executing various computational tasks. The processing means may include one or more processors, microprocessors, or computing devices capable of executing machine-readable instructions stored in a memory or other storage medium. In certain embodiments, the processing means is configured to receive input data from one or more input devices or sensors, process the data according to predefined algorithms, and generate output signals corresponding to the processed data. The processing means may operate in conjunction with a plurality of software modules or firmware components to perform specific operations, such as data analysis, control of peripheral devices, or user interface management. Furthermore, the processing means may be implemented in hardware, software, or a combination thereof and can include, but is not limited to, general-purpose processors, application-specific integrated circuits (ASICs), FPGAs, or digital signal processors (DSPs).

A storage means stores a cloud-based database of audio files 106 corresponding to the at least one specific page or page spread. The storage means may comprise one or more types of memory devices, including but not limited to volatile memory such as random-access memory (RAM) and non-volatile memory such as read-only memory (ROM), flash memory, or magnetic storage devices like hard drives. The storage means may store machine-readable instructions that are executed by a processing means, as well as temporary or permanent data generated during system operation. In certain embodiments, the storage means is configured to retain data persistently, ensuring that information is available even when the system is powered down. The storage means may be local to the system or distributed across a network and may be implemented in hardware, software, or a combination of both, allowing for scalable data storage and retrieval as needed by the system.

A playback means triggers and controls an audio playback based on the at least one specific page or page spread. The system maintains a cloud-based database of audio files 106 mapped to specific covers, pages, or page spreads. The system may include a cloud-based content delivery network (CDN) for efficient audio file distribution, local caching mechanism to store frequently accessed audio files, reducing data usage and improving playback speed, adaptive streaming technology to adjust audio quality based on network conditions, support for multiple audio tracks per page, including narration, sound effects, and musical accompaniment, integration with Third-party music streaming services 302, allowing users to incorporate their personal playlists, AI (Artificial Intelligence)-driven ambient music generation based on page imagery, AI-based interpretation and recreation of copyrighted music when streaming is unavailable, or some combination thereof. These audio files may contain narration, sound effects, musical accompaniment, additional commentary or explanations, or some combination thereof. When a new page is detected, the system seamlessly transitions to the appropriate audio file, ensuring synchronization with the reader's progress.

The playback means may comprise one or more speakers, headphones, or other audio output devices capable of converting electrical audio signals into audible sound. In some embodiments, the playback means includes digital-to-analog conversion components that process digital audio data stored in a storage means or received from a processing means, translating it into analog signals for audible playback. The playback means may be configured to support various audio formats, including but not limited to MP3, WAV, and AAC, and may allow for playback control, such as play, pause, rewind, and fast-forward functions. In certain implementations, the playback means may further include volume adjustment capabilities and be optimized for high-fidelity audio reproduction. The playback means may be integrated into the system or connected externally, either via wired or wireless communication protocols.

Figure 2:
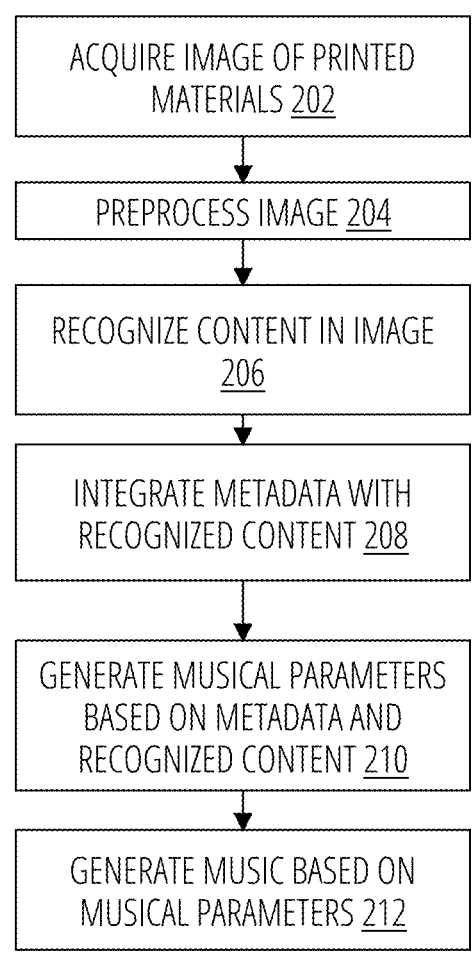
FIG. 2 illustrates an aspect of the subject matter in accordance with one embodiment.

Referring to FIG. 2, Images of printed materials are acquired 202. The images may then be preprocessed 204 using image preprocessing techniques. The system then recognizes the content in the images 206 utilizing the processing means. The system then integrates the metadata with recognized content 208. Musical parameters are generated based on metadata and recognized content 210. Music is generated based on musical parameters 212.

Figure 3:
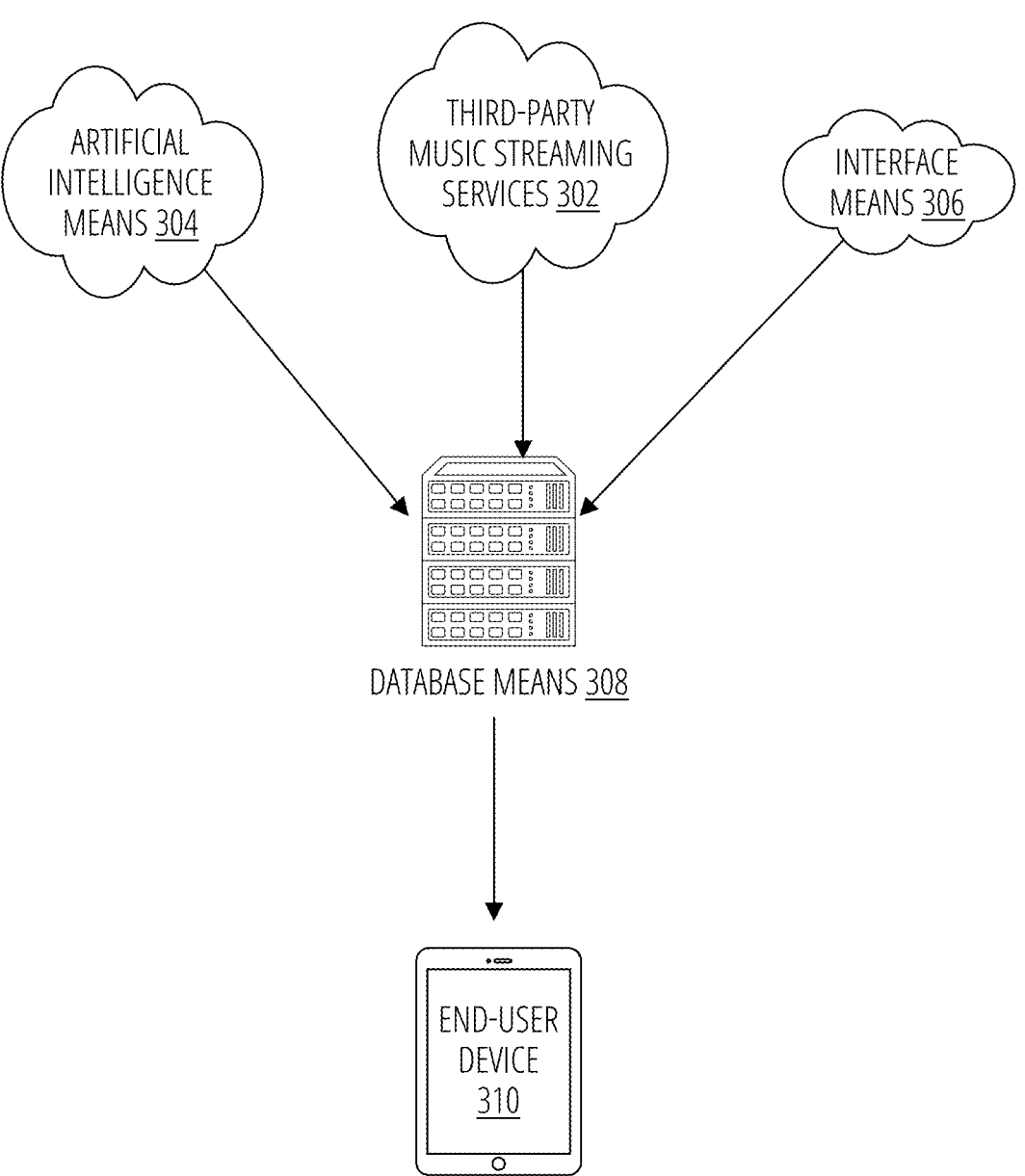
FIG. 3 illustrates an aspect of the subject matter in accordance with one embodiment.

Referring to FIG. 3, an Artificial intelligence means 304 generates ambient music based on recognized at least one specific page or page spread. The system employs a high-resolution camera with low-latency image processing capabilities, such as 60 fps capture using a 4K resolution CMOS (complementary metal oxide semiconductor) sensor, to capture the book's cover or current page spread in real time. An embedded neural network, optimized for edge computing, performs rapid image segmentation and feature extraction. A lightweight convolutional neural network (CNN) identifies text, images, and layout elements. The recognized content is cross-referenced with the book's preloaded metadata using a hash table for O(1) lookup time. A recurrent neural network (RNN) with LSTM (long short-term memory) cells processes the combined visual and metadata inputs to generate musical parameters. A wavetable synthesizer with real-time DSP effects renders the generated music with sub-10 ms latency to a user's headphones. The entire pipeline operates within a 100 ms processing window to ensure seamless audio-visual synchronization as the reader progresses through the book.

An Interface means 306 allows content creators to upload and map audio files to at least one specific page or page spread. A Database means 308 stores and organizes the mapped audio files. A distribution means delivers the mapped audio files to an end-user device 310. The Interface means 306 allows content creators to upload and manage that audio content, create interactive elements tied to specific covers, pages, and page spreads, sign into third-party music streaming services to link a playlist, and start to end timestamps from each track, upload book files to create and publish on the system, or any combination thereof.

The system includes a means for integrating Third-party music streaming services 302 with the system. A means for specifying start and end timestamps for audio files mapped to at least one specific page or page spread.

Referring to FIG. 4, in one aspect, a method of enhancing printed material with synchronized audio content includes a routine 400. The image capture means 104 is positioned using the wearable positioning means 502 such that the image capture means 104 can capture images of printed material 406. The mobile application utilizes the device's camera to capture an image of the printed media. The captured image undergoes preprocessing, such as resizing to a standardized dimension (e.g., 300×300 pixels), to ensure consistent processing and conversion to grayscale to reduce computational complexity and mitigate color variation issues.

The preprocessed captured images are analyzed using at least one computer vision algorithm 414. The system extracts ORB features from the preprocessed image. The ORB algorithm detects FAST (Features from Accelerated Segment Test) key points, applies a Harris corner measure to find top N points with the highest corner response values, uses the intensity centroid as a measure of orientation, and computes the oriented BRIEF (Binary Robust Independent Elementary Features) descriptors. These extracted features provide a robust representation of the image that is invariant to rotation and moderate changes in scale and lighting.

At least one specific page or page spread from the captured image is recognized using the at least one computer vision algorithm 416. The at least one computer vision algorithm performs a two-stage matching process:

Stage 1: Perceptual Hash Matching: a) The received hash is compared against a database of pre-computed hashes of reference images. b) The Hamming distance between the received hash and stored hashes is calculated. c) Reference images with a Hamming distance below a predetermined threshold are selected as candidates for the second stage.

Stage 2: ORB Feature Matching: a) For each candidate image selected in Stage 1, the server retrieves its pre-computed ORB descriptors. b) The server performs a brute-force matching of the received ORB descriptors against the stored descriptors for each candidate. c) A ratio test is applied to filter good matches, where a match is considered good if the distance to the closest match is less than 75% of the distance to the second closest match. d) The number of good matches is normalized by the total number of key points to produce a similarity score. e) The candidate image with the highest similarity score above a predetermined threshold is selected as the final match.

If a match is found, the server retrieves the identifier for the associated audio file from its database. The server sends a response to the mobile application containing a) Match status (found/not found), b) Matched image data (if applicable), and c) Audio file identifier (if a match was found). A cloud-based database of audio files 106 corresponding to the at least one specific page or page spread are stored on the storage means 420. The mobile application: a) Receives the server response, b) If a match was found, fetches the corresponding audio file using the provided identifier, c) If no match was found, selects a default "no match" audio file, and d) Initiates playback of the appropriate audio file using the device's audio system. An audio playback is triggered and controlled based on the at least one specific page or page spread using the playback means 424.

The application displays match results to the user. The user interface shows matched images from the database (if a match was found). If not a match, the app notifies the user of the "no match" status. Audio playback begins (either matched audio or default "no match" audio).

The application logs performance metrics (e.g., processing time, match confidence). These logs can be used for system optimization and user experience improvement.

The server periodically analyzes matching performance and user feedback. Hash and ORB feature thresholds are adjusted as needed to optimize accuracy. A database of reference images and hashes is updated with new content as available.

Figure 5:
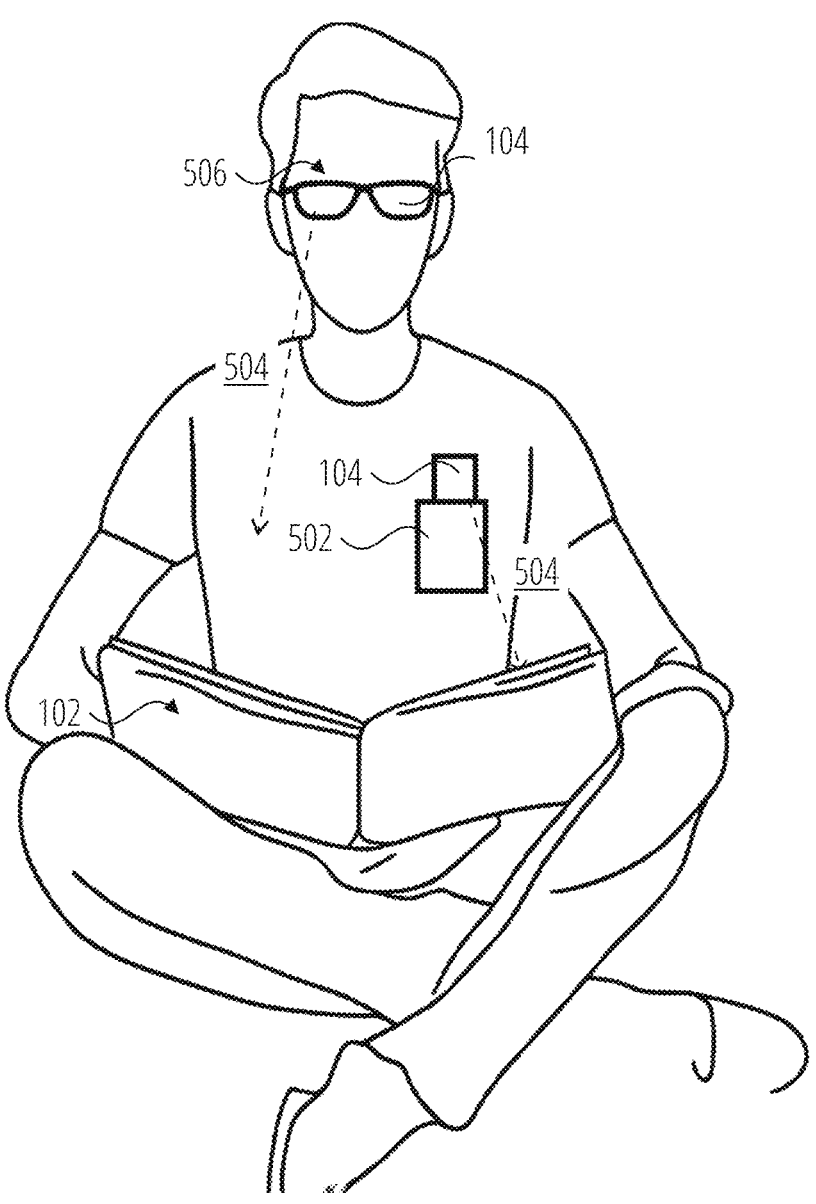
FIG. 5 illustrates an aspect of the subject matter in accordance with one embodiment.

Referring to FIG. 5, a wearable positioning means 502 allows for hands-free positioning of the image capture means 104 such that the image capture means 104 maintains a line of sight 504 with the printed material 102. The wearable positioning means 502 may include a flexible pocket adapted to hold a mobile device or wearable camera and an attachment means for securing the flexible pocket to a user 108's clothing. The wearable positioning means 502 may include an over-the-eye mounted display system 506. The display would be capable of tracking eye movement while capturing images of the printed material. The wearable positioning means 502 ensures consistent and stable positioning of the device's camera, enhancing the accuracy of page recognition. The wearable positioning means 502 may include magnetic clips, physical clips, or other attachments to the user's chest.

As described in detail herein, the present invention can be embodied in various forms without departing from its spirit or essential characteristics. The scope of the invention is indicated by the appended claims, and all changes that come within the meaning and range of equivalence thereof are intended to be embraced. Equivalent or comparable means or combinations of the disclosed features may also be used to realize the invention in diverse forms. The invention is described in detail with reference to certain embodiments, but variations and modifications exist within the spirit and scope of the invention as described and defined in the claims.

What is claimed is:

1. A system for enhancing printed material with synchronized audio content, comprising:

an image capture means for capturing images of printed pages;

a processing means for analyzing the captured images of printed pages using at least one computer vision algorithm to recognize at least one specific page or page spread;

the at least one computer vision algorithm performs a two-stage matching process:

stage 1 is perceptual Hash Matching comprising:

a) a received hash is compared against a database of pre-computed hashes of reference images:

b) a Hamming distance between the received hash and the pre-computed hashes of reference images is calculated:

c) the pre-computed hashes of reference images with a Hamming distance below a predetermined threshold are selected as candidates for the second stage:

stage 2 is ORB Feature Matching comprising:

a) for each candidate image selected in stage 1, a server retrieves its pre-computed ORB descriptors;

b) the server performs a brute-force matching of the received ORB descriptors against stored descriptors for each candidate image;

c) a ratio test is applied to filter good matches, where a match is considered good if the distance to the closest match is less than 75% of the distance to the second closest match;

d) a number of good matches is normalized by the total number of key points to produce a similarity score;

e) a candidate image with a highest similarity score above a predetermined threshold is selected as a final match;

a storage means for storing a database of audio files corresponding to the at least one specific page or page spread;

a playback means for triggering and controlling an audio playback based on the at least one specific page or page spread; and a wearable positioning means for hands-free positioning of the image capture means.

2. The system of claim 1, comprising an artificial intelligence means for generating ambient music based on the recognized at least one specific page or page spread.

3. The system of claim 1, wherein the wearable positioning means comprises:

a flexible pocket adapted to hold a mobile device or wearable camera; and an attachment means for securing the flexible pocket to a user's clothing.

4. The system of claim 1, wherein:

the at least one computer vision algorithm comprises a convolutional neural network, feature extraction techniques, or image preprocessing techniques.

5. The system of claim 4, wherein the feature extraction techniques comprise Scale-Invariant Feature transform (SIFT), Oriented features from accelerated segment test and Rotated Binary robust independent elementary features (ORB) or Accelerated KAZE algorithm (AKAZE).

6. The system of claim 4, wherein the image preprocessing techniques comprise adaptive thresholding or perspective correction.

7. The system of claim 1, comprising:

an interface means for content creators to upload and map audio files to the at least one specific page or page spread;

a database means for storing and organizing the mapped audio files; and a distribution means for delivering the mapped audio files to an end-user device.

8. The system of claim 1, comprising:

a means for integrating third-party music streaming services with the system; and a means for specifying start and end timestamps for the audio files mapped to the at least one specific page or page spread.

9. A method of enhancing printed material with synchronized audio content, comprising:

providing an image capture means;

providing a wearable positioning means for hands-free positioning of the image capture means;

positioning the image capture means using the wearable positioning means such that the image capture means can capture images of a printed material;

capturing images of printed pages of the printed material using the image capture means;

providing a processing means;

providing at least one computer vision algorithm;

analyzing at least one captured image using the at least one computer vision algorithm;

the at least one computer vision algorithm performs a two-stage matching process:

stage 1 is perceptual Hash Matching comprising:

a) a received hash is compared against a database of pre-computed hashes of reference images:

b) a Hamming distance between the received hash and the pre-computed hashes of reference images is calculated:

c) the pre-computed hashes of reference images with a Hamming distance below a predetermined threshold are selected as candidates for the second stage:

stage 2 is ORB Feature Matching comprising:

a) for each candidate image selected in stage 1, a server retrieves its pre-computed ORB descriptors;

b) the server performs a brute-force matching of the received ORB descriptors against stored descriptors for each candidate image;

c) a ratio test is applied to filter good matches, where a match is considered good if the distance to the closest match is less than 75% of the distance to the second closest match;

d) a number of good matches is normalized by the total number of key points to produce a similarity score;

e) a candidate image with a highest similarity score above a predetermined threshold is selected as a final match:

recognizing at least one specific page or page spread from the captured image using the at least one computer vision algorithm;

providing a storage means;

storing a database of audio files corresponding to the at least one specific page or page spread on the storage means;

providing a playback means; and triggering and controlling an audio playback based on the at least one specific page or page spread using the playback means.

10. A system for enhancing printed material with synchronized audio content, comprising:

an image capture means for capturing images of printed pages;

a processing means for analyzing the captured images of printed pages using at least one computer vision algorithm to recognize at least one specific page or page spread, wherein, the at least one computer vision algorithm comprises a convolutional neural network, feature extraction techniques, or image preprocessing techniques, wherein:

the at least one computer vision algorithm performs a two-stage matching process:

stage 1 is perceptual Hash Matching comprising:

a) a received hash is compared against a database of pre-computed hashes of reference images:

b) a Hamming distance between the received hash and the pre-computed hashes of reference images is calculated:

c) the pre-computed hashes of reference images with a Hamming distance below a predetermined threshold are selected as candidates for the second stage:

stage 2 is ORB Feature Matching comprising:

a) for each candidate image selected in stage 1, a server retrieves its pre-computed ORB descriptors;

b) the server performs a brute-force matching of the received ORB descriptors against stored descriptors for each candidate image:

c) a ratio test is applied to filter good matches, where a match is considered good if the distance to the closest match is less than 75% of the distance to the second closest match:

d) a number of good matches is normalized by the total number of key points to produce a similarity score:

e) a candidate image with a highest similarity score above a predetermined threshold is selected as a final match:

the feature extraction techniques comprise Scale-Invariant Feature transform (SIFT), Oriented features from accelerated segment test and Rotated Binary robust independent elementary features (ORB) or Accelerated KAZE algorithm (AKAZE); and the image preprocessing techniques comprise adaptive thresholding or perspective correction;

an artificial intelligence means for generating ambient music based on the recognized at least one specific page or page spread;

a storage means for storing a database of audio files corresponding to the at least one specific page or page spread;

a playback means for triggering and controlling an audio playback based on the at least one specific page or page spread;

a wearable positioning means for hands-free positioning of the image capture means, wherein the wearable positioning means comprises a flexible pocket adapted to hold a mobile device or wearable camera, and attachment means for securing the flexible pocket to a user's clothing; and an interface means for content creators to upload and map audio files to the at least one specific page or page spread;

a database means for storing and organizing the mapped audio files;

a distribution means for delivering the mapped audio files to an end-user device;

a means for integrating third-party music streaming services with the system; and a means for specifying start and end timestamps for the audio files mapped to at least one specific page or page spread.

* * * * *